Nov. 18, 1947.  B. H. HADLEY  2,431,117
BACK-UP WARNING DEVICE
Filed Oct. 13, 1945
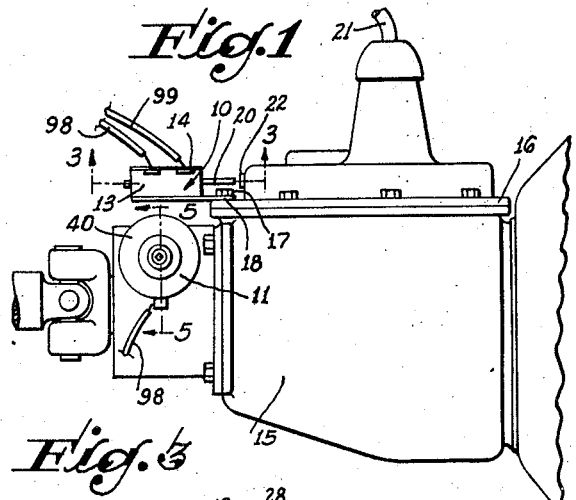
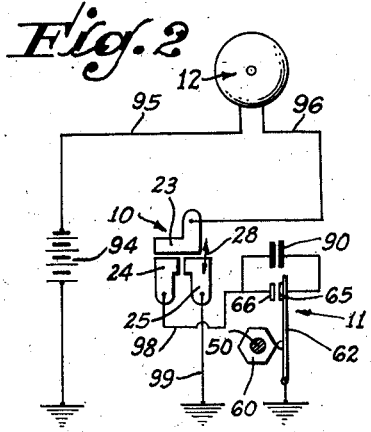
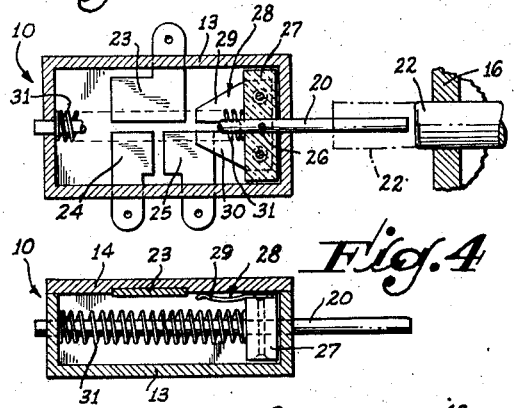
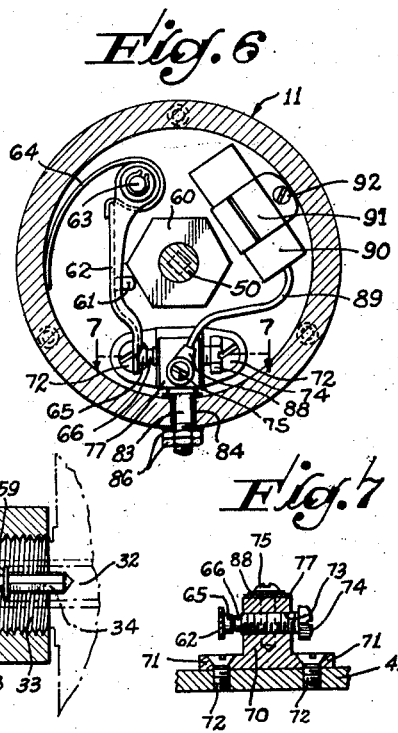
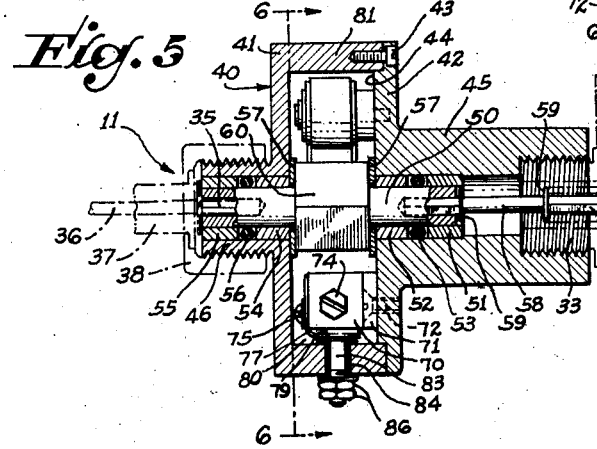
INVENTOR
BENJAMIN H. HADLEY
BY
HARRIS, KIECH, FOSTER & HARRIS
FOR THE FIRM
ATTORNEYS Patented Nov. 18, 1947

2,431,117

UNITED STATES PATENT OFFICE 2,431,117

BACKUP WARNING DEVICE

Benjamin H. Hadley, Pomona, Calif.

Application October 13, 1945, Serial No. 622,117

4 Claims. (Cl. 177—339)

My invention relates to automatic safety signals, either visible or audible; to a system for warning of impending danger from rearwardly traveling vehicles; and to intermittent switches particularly useful in energizing warning circuits.

In the trucking or transportation industries, particularly when the driver's rearward field of view is limited or obstructed, it is important, and often required by law, that an automotive vehicle be equipped with a warning indicating proposed or actual rearward movement of the vehicle. Heretofore, certain conventional backup warning devices employ merely a switch energizing a warning circuit when the gear shift lever is moved into reverse position or employ a manually closable switch, which too often, the operator fails or forgets to use.

It is an object of the present invention to energize a warning circuit automatically during actual rearward movement of a vehicle.

Another object is to produce a warning system which emits an intermittent signal at a frequency proportional to the speed of a rearwardly moving vehicle. Such a variable-frequency signal is very desirable and effective as the character of the warning indicates the degree of the impending danger.

A further object is to provide a system which gives a preliminary warning of impending danger even before the vehicle starts to move rearwardly, this preliminary warning being followed by intermittent warning signals during actual rearward movement of the vehicle. In this connection, the preferred embodiment of the invention comprehends the joint use of two electrical switches, hereinafter designated as a transmission switch and an intermittent switch, these switches being connected in series relationship to actuate audible or visible signals.

Additional objects of the invention reside in the provision of novel switch constructions and a novel intermittent switch readily adapted to mounting on automotive vehicles.

Still further objects and advantages of the invention will be evident to those skilled in the art from the following description of an exemplary embodiment.

Referring to the drawing:

Fig. 1 is a side elevational view showing a conventional transmission housing and its relationship to the switches of the invention;

Fig. 2 is a schematic diagram of an electrical circuit for utilizing the invention;

Fig. 3 is a sectional view of the transmission switch of the invention, taken along the line 3—3 of Fig. 1;

Fig. 4 is a longitudinal sectional view of the transmission switch;

Fig. 5 is a longitudinal sectional view of the intermittent switch of the invention, being taken along the line 5—5 of Fig. 1;

Fig. 6 is a sectional view of the intermittent switch, taken along the line 6—6 of Fig. 5; and Fig. 7 is a fragmentary sectional view, taken along the line 7—7 of Fig. 6.

In general, the invention comprehends the use of a control switch, shown as a transmission switch 10, actuated by the gear shifting mechanism of the vehicle and connected in series with an intermittent switch 11 actuated by movement of the vehicle, whether forward or rearward, the switch 11 intermittently energizing a warning circuit only during the time that the vehicle is geared in reverse. The warning circuit includes a warning device of the visible or audible type, preferably near the rear of the vehicle and shown as including an electric gong 12 (see Fig. 2). This gong is preferably of the type which produces a single loud note or warning each time it is energized, although a gong ringing continuously during periods of energization can be employed.

The details of the transmission switch 10 and its operating environment are best shown in Figs. 1, 3, and 4. Referring thereto, this auxiliary switch includes a housing 13 providing a removable cover 14 and suitably secured to the transmission of the vehicle. In Fig. 1, this transmission is indicated by the numeral 15 and includes a cover 16 held in place by bolts 17. Beneath one of these bolts is a bracket 18 secured to the housing 13.

Journalled in the housing 13 is an operating rod 20 extending in the locus of motion of some element of the transmission 15 which moves when a gear shift lever 21 is moved into "reverse" position. In the embodiment of Fig. 1, this transmission element is indicated as a reciprocating element 22 extending from the transmission to contact and move the operating rod 20 when the gear shift lever 21 is moved into "reverse" position. In those instances in which no such reciprocating element 22 extends from the transmission, it is desirable to drill a hole in the housing of the transmission in some position such that the operating rod 20 is engageable by an internal element of the transmission having a movement similar to that of the reciprocating element 22 shown.

Within the housing 13 are mounted first and second control contacts 23 and 24 and an auxiliary contact 25. These contacts are preferably flat and, if desired, may be embedded in, or mounted on, the cover 14 to be removable therewith. Each contact provides a tab extending exterior of the housing 13.

Secured to the operating rod 20, as by a pin 26, is a block of insulating material 27 carrying a movable contact member, generally indicated by the numeral 28. The forward end of this contact is bifurcated to provide contact portions 29 and 30. A spring 31 surrounds the operating rod 20 within the housing 13 and urges the block 27 and the movable contact member 28 resiliently rightward and into the position shown in Fig. 3.

This movable contact member 28 serves as a bridging contact during movement of the operating rod 20 as this rod is moved by the reciprocating element 22. Prior to such movement, the contact portion 30 resiliently engages the auxiliary contact 25 although the contact portion 29 is spaced from the control contact 23. During shifting of the vehicle transmission 15 into "reverse," the movable contact member 28 transiently bridges the contacts 23 and 25 and, thereafter, bridges the control contacts 23 and 24.

The details of the intermittent switch 11 are best shown in Figs. 1, 5, 6, and 7. It is preferably disposed in the speedometer drive of the vehicle and is designed to close a pair of contacts intermittently during forward or reverse movement of the vehicle.

Preferably, this intermittent switch is constructed as an adapter unit to be readily connected to conventional vehicles. In the system disclosed, the speedometer drive is from the transmission 15, shown in Fig. 5 as including a rotary member 32 turning in opposite directions upon forward and rearward movement of the vehicle and accessible through a threaded neck 33. The end of this rotary member 32 provides a square opening 34 conventionally receiving a square speedometer-drive member 35 attached to the end of a flexible drive member 36 extending to the speedometer and enclosed by a flexible conduit 37. Conventionally, and in the absence of the invention an internally-threaded coupling member 38 is threaded on the neck 33 to hold the speedometer-drive member 35 within the squared opening 34. In Figs. 1 and 5, the intermittent switch 11 is shown as interposed in the speedometer drive at this point.

Referring particularly to Figs. 5 and 6, the intermittent switch 11 provides a housing, indicated generally by the numeral 40 and comprising a cup-shaped member 41 and a cover member 42 secured together, as by countersunk screws 43, and cooperating in providing a chamber 44. The cover member 42 provides a neck 45 internally threaded to receive the threaded neck 33. The cup-shaped member 41 provides a threaded neck 46 adapted to receive the coupling member 38.

Suitably journalled in the housing 40 is a shaft 50. To effect this journalling, I prefer to employ sleeve bearings 51 and 52 pressed into the neck 45 and spaced to receive a sealing ring 53. Similarly, the threaded neck 46 carries, pressed therein, sleeve bearings 54 and 55 which are spaced to receive a sealing ring 56. The sealing rings 53 and 56 are preferably of doughnut shape and are formed of rubber to engage resiliently the periphery of the shaft 50 and respectively provide grease seals to prevent entry of grease into the chamber 44, either from the transmission or from the flexible conduit 37. The bearings 52 and 54 preferably engage washers 57 disposed within the chamber 44.

The ends of the shaft 50 provide squared openings. One of these squared openings receives the speedometer-drive member 35. The other of these squared openings receives a squared end of a stub drive connection 58. The other end of this stub drive connection 58 is also squared and extends into the squared opening 34 of the rotary member 32. Washers 59, secured to the stub drive connection 58, limit movement of the ends thereof into their respective squared openings.

Between the washers 57, the shaft 50 carries a cam 60, shown as being hexagonal to provide a plurality of crests. Adapted to ride along the cam surface and over the crests thereof is a follower 61, preferably formed of insulating material, carried by a switch arm 62 journalled on a pin 63 paralleling the axis of the shaft 50 and retained in the cover member 42. A spring 64 provides one end in engagement with the peripheral wall of the chamber 44 and another end coiled around the journalled portion of the switch arm 62, this spring resiliently urging the follower 61 toward the periphery of the cam 60. The free end of the switch arm 62 carries a movable contact 65, and the cam 60 is designed to move this contact into and from engagement with a stationary contact 66. The movable and stationary contacts 65 and 66 comprise a pair of make-and-break contacts intermittently separated by rotation of the cam 60. The movable contact 65 is preferably grounded to the frame of the vehicle through the housing 40 and the transmission 15.

The mounting for the stationary contact 66 is best shown in Figs. 6 and 7. Referring thereto, a post 70 provides ears 71 suitably secured to the cover member 42, as by countersunk screws 72. This post 70 is formed of insulating material and is drilled and threaded transversely to provide a threaded bore 73 to receive a bolt 74 whose forward end serves as the stationary contact 66. By turning the bolt 74, the position of the contact 66 is adjustable. The preferred adjustment is such that the period of engagement of the contacts 65, 66 is greater than the period of disengagement. In other words, with this desirable adjustment, the follower 61 will separate from the peripheral surface of the cam 60 except near the crests thereof.

The stationary contact 66 is, in effect a "live" contact and electrical connection is made thereto by use of a machine screw 75 threaded into an opening 76 transverse to the threaded bore 73 and intersecting same at its periphery. In practice, the machine screw 75 is first threaded into position, after which the bore 73 is formed and threaded so that a portion of the threads of the bore 73 is cut in the side of the machine screw 75, wherefore the bolt 74 makes good electrical contact with the machine screw 75 and prevents any unscrewing of the latter.

Beneath the head of the machine screw 75 and the innermost end of the post 70 is one leg of an L-shaped conductor strap 77, the other leg forming a resilient contact portion 79, best shown in Fig. 5 as extending into a space 80 between one side of the post 70 and the peripheral wall of the cup-shaped member 41, this peripheral wall being indicated by the numeral 81. This peripheral wall is traversed by a headed contact member 83 insulated from the wall by a sleeve of insulating material 84, the head of the member 83 being resiliently engaged by the resilient contact portion 79 of the L-shaped conductor strap 77. The outer end of the contact member 83 extends from the housing 40 and is threaded to receive nuts 86, by which electrical connection to the intermittent switch can be made. No change in electrical connections need be made when the housing 40 is opened for inspection. If the screws 43 are removed, the cup-shaped member 41 and the cover member 42 can be separated, the resilient contact portion 79 sliding along the head of the contact member 83 at this time. In re-assembling the members 41, 42, they are correctly oriented angularly, after which they are moved together. The resilient contact portion 79 slides along the head of the contact member 83 during this movement.

Also disposed beneath the head of the machine screw 75 is a terminal 88 connected through a conductor 89 to a condenser 90 retained within the housing 40 by a clip 91 secured in place by a screw 92. The other terminal of this condenser 90 is grounded to the housing 40 and thence to the frame of the vehicle. The function of this condenser is to reduce arcing when the make-and-break contacts 65, 66 separate. In addition, this condenser stores energy when the contacts are open and produces a desirable electrical surge to the electric gong 12 when the contacts 65, 66 are closed, thus insuring quick action of the electric gong.

The preferred electrical connections are shown in Fig. 2 where the switch arm 62 is shown as grounded to the frame of the vehicle, as is also one terminal of a battery 94. The remaining terminal of the battery is connected by conductor 95 to one terminal of the gong 12. A conductor 96 connects the other gong terminal to the first control contact 23. A conductor 98 extends from the second control contact 24 to the head contact member 83 and thence through the resilient contact portion 79, the machine screw 75, and the bolt 74 to the stationary contact 66. The condenser 90 is connected in circuit across the contacts 65, 66 as previously described. Finally, a conductor 99 connects the auxiliary contact 25 to ground. The movable contact member 28 is diagrammatically shown in Fig. 2 as a double-headed arrow suggesting its ability, when moved leftward in Fig. 2, to transiently connect contacts 23 and 25 and later connect contacts 23 and 24.

The operation of the invention is as follows. During any normal forward movement of the vehicle, the cam 60 will turn in a forward direction and the contacts 65, 66 of the intermittent switch 11 will engage and disengage. However, the gong 12 will not be energized at this time as there is no connection between the contacts 23 and 24 of the transmission switch 10.

If the driver intends to back up the vehicle, he must first move the gear shift lever 21 to reverse position. During the first portion of this movement of the gear shift lever, the reciprocating element 22 will actuate the transmission switch 10 to bridge the movable contact member 28 transiently across the contacts 23 and 25. This transiently energizes the gong 12, current flowing from the grounded terminal of battery 94 through contact 25, contact 23, conductor 96, and conductor 95. The gong will thus emit a preliminary warning of short duration during shifting of the gears to reverse position. This preliminary warning will be given irrespective of whether the contacts 65, 66 of the intermittent switch are closed, and warns persons in the vicinity of the vehicle of impending danger.

During the latter part of the movement of the reciprocating member 22 when shifting into reverse position, the movable contact member 28 moves from bridging relationship with contacts 23 and 25 and into bridging relationship with contacts 23 and 24. This connects the gong 12 in series with the intermittent switch 11. If the make-and-break contacts 65, 66 happen to be closed, this bridging of the contacts 23 and 24 will immediately energize the gong 12 to produce an additional preliminary warning, even though the vehicle has not yet started its rearward movement. The circuit in this instance is from the grounded side of the battery 94 through switch arm 62, contacts 65, 66, conductor 98, contacts 24, 23, and conductors 96 and 95.

As soon as the vehicle starts to move to its reverse position, the cam 60 will begin to turn rearwardly at a rate proportional to the rearward velocity of the vehicle. This will intermittently close the contacts 65, 66 to complete the aforesaid circuit. The gong 12 will give a warning note each time the contacts 65, 66 come into engagement, wherefore the rate of the warning notes given by the gong will give an indication of the degree of impending danger from the rearwardly moving vehicle.

Various changes and modifications can be made without departing from the spirit of the invention as defined in the appended claims.

I claim as my invention:

1. In a back-up warning system for vehicles having an element movable during gear changing for reverse movement and having a rotary member movable in forward and reverse directions upon forward and reverse movement of said vehicle, said vehicle carrying a warning device having a pair of terminals, the combination of: an intermittent switch including a pair of make-and-break contacts and means for intermittently engaging said contacts upon turning of said rotary member in either of said directions; a control switch having first and second control contacts and having an auxiliary contact; means for transiently connecting said first control contact and said auxiliary contact upon movement of said element during gear changing to reverse position but before completion of such movement and for connecting said first control contact and said second control contact upon completion of said movement; a conductor connecting said first control contact to one of said terminals of said warning device; conductor means for energizing the other terminal of said warning device and connected both to said auxiliary contact and one of said make-and-break contacts; and conductor means connecting the other of said make-and-break contacts to said second control contact.

2. In a back-up warning system for vehicles having an element movable during gear changing for reverse movement and having a rotary member movable in forward and reverse directions upon forward and reverse movement of said vehicle, the combination of: an intermittent switch including a pair of make-and-break contacts and means for intermittently engaging said contacts upon turning of said rotary member in either of said directions; a control switch having a pair of control contacts; means for electrically connecting said control contacts in response to movement of said element during gear changing for reverse movement; a warning circuit connecting said control contacts and said make-and-break contacts in series circuit to energize said warning circuit intermittently during rearward movement of said vehicle but to avoid such energization during forward movement of said vehicle; and means for transiently energizing said warning circuit during but before completion of said movement of said element.

3. In a back-up warning system for vehicles having an element movable during gear changing for reverse movement and having a rotary member movable in forward and reverse directions upon forward and reverse movement of said vehicle, the combination of: an intermittent switch including a pair of make-and-break contacts and means for intermittently engaging said contacts upon turning of said rotary member in either of said directions; a control switch having a pair of control contacts and an auxiliary contact; means for electrically connecting said control contacts in response to movement of said element during gear changing for reverse movement; a warning circuit connecting said control contacts and said make-and-break contacts in series circuit to energize said warning circuit intermittently during rearward movement of said vehicle but to avoid such energization during forward movement of said vehicle; and means for transiently energizing said warning circuit through said auxiliary contact irrespective of whether said make-and-break contacts are engaged and during said movement of said element.

4. In a back-up warning system for a vehicle adapted to be geared for forward and reverse movement, said vehicle carrying a warning device, the combination of: a pair of make-and-break contacts; means for intermittently energizing said contacts during both forward and rearward movement of said vehicle; means for intermittently energizing said warning device through said make-and-break contacts only during rearward movement of said vehicle, said means including a control switch, means for closing said control switch only when said vehicle is geared for reverse movement, and means for connecting said make-and-break contacts and said control switch to said warning device; and means for transiently energizing said warning device during gearing of said vehicle for reverse movement.

BENJAMIN H. HADLEY.

REFERENCES CITED

The following references are of record in the file of this patent:

UNITED STATES PATENTS

| Number | Name | Date |
| --- | --- | --- |
| 1,135,999 | Egerton | Apr. 20, 1915 |
| 1,191,973 | Johnson | July 25, 1916 |
| 1,469,337 | Sanborn | Oct. 2, 1923 |
| 1,589,653 | Morris | June 22, 1926 |
| 1,719,394 | Daniel | July 2, 1929 |
| 1,808,316 | Osgian | June 2, 1931 |
| 2,231,429 | Simmons | Feb. 11, 1941 |